(12) United States Patent
Martenson (10) Patent No.: US 6,219,708 B1
(45) Date of Patent: *Apr. 17, 2001

(54) SYSTEM FOR NETWORK RESOURCE MANAGEMENT

(75) Inventor: Dale Warner Martenson, Mounds View, MN (US)

(73) Assignee: Multi-Tech Systems, Inc., Mounds View, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/657,752

(22) Filed: May 30, 1996

(51) Int. Cl.[7] .............................. G06F 13/38; G06F 15/17

(52) U.S. Cl. ............................................ 709/226; 709/223

(58) Field of Search ...................... 395/200.51, 200.52, 395/200.53, 200.59, 835–839, 200.54, 200.56; 340/825.06; 709/223, 226, 221, 222, 229, 224; 710/15, 16, 17, 18, 19

(56) References Cited

U.S. PATENT DOCUMENTS

| | | | |
|---|---|---|---|
| 4,864,492 | * 9/1989 | Blakely-Fogel et al. | 395/200.5 |
| 4,942,540 | * 7/1990 | Black et al. | 395/200.5 |
| 4,956,852 | * 9/1990 | Hodge | 340/825.54 |
| 5,426,421 | * 6/1995 | Gray | 395/200.53 |
| 5,544,320 | * 8/1996 | Konrad | 395/200.09 |
| 5,586,255 | * 12/1996 | Tanaka et al. | 395/200.53 |
| 5,655,081 | * 8/1997 | Bonnell et al. | 395/200.32 |
| 5,742,762 | 4/1998 | Scholl et al. | 395/200.3 |

OTHER PUBLICATIONS

W3C Jigsaw page<see http://www.w3.org/Jigsaw/> for release date information the document W3C Open Source Releases is reprinted from <http://www.w3.org/Status.html>, (Date Unknown).

Whitehouse, D., "VRML Adds a Dimension to Web Browsing", *IEEE Computer Graphics Applications*, pp. 7–9, (1996).

Release Notes for Cisco IOS Release 11.1, Sep. 1997.*

The JAVA Language: An Overview, 1995.*

Java Platform White Paper : What is the Java Platform?, 1996.*

The Virtual Reality Modeling Language Version 1.0, Nov. 1995.*

"Management Information Base for the MultiModem Manager", SNMP version of the present application, pp. 1–58, (May 15, 1996).

Korzeniowski, P., "A Web–Based Revolution", *Information Week*, Systems Management Special Report, pp. 80–82, (May 5, 1997).

(List continued on next page.)

*Primary Examiner*—Mark H. Rinehart
(74) *Attorney, Agent, or Firm*—Schwegman, Lundberg, Woessner & Kluth, P.A.

(57) ABSTRACT

A system for network resource management. The system having a network module for interfacing a network resource to the network. The network module having an instruction module for translating network messages into instructions which are used by the network resource to perform functions and operations. The system providing for remote client control of a resource using common network protocol languages, thereby enabling a user to manage the resource using an existing browser. The system providing a simplified user interface for network resource management.

22 Claims, 5 Drawing Sheets

Microfiche Appendix Included
(2 Microfiche, 266 Pages)

OTHER PUBLICATIONS

Pepper, J., "Web Access Added", *Information Week*, pp. 79–80, (Mar. 17, 1997).

Rose, M.T., "An Introduction to Networking Management", *The Simple Book*, Prentice Hall, 17 pages, (1996).

"MultiTech MultiModem Manager—Owner's Manual", Tables of Contents, 9 chapters, appendices A–C, index, (Sep. 5, 1995).

John Rendleman, "Web–Based Network Monitoring", *Communications Week*, Pg. 8, (Apr. 29, 1996).

Michael Surkan, "Cisco Leverages Web to Keep Eye on Routers", *PC Week*, Pgs. 1 and 126, (Apr. 15, 1996).

"Disk Drive with Embedded Hyper–Text Markup Language Server", *IBM Technical Disclosure Bulletin, vol. 38, No. 12*, 479, (Dec. 1995).

* cited by examiner

SYSTEM FOR NETWORK RESOURCE MANAGEMENT

TECHNICAL FIELD OF THE INVENTION

The present invention relates generally to management of network resources, and more particularly to management and control of network resources by a remote client using existing network protocols and languages.

MICROFICHE APPENDIX ATTACHED

A microfiche appendix is attached to this detailed description.

BACKGROUND OF THE INVENTION

Network computing has become increasingly popular. For example, a number of new devices have been introduced for use on a variety of networks from local area networks to the Internet and World Wide Web. The increasing complexity of network communications raises the issue of improved network resource management. For the purposes of this specification, any device or system associated with the network is a "resource" of the network.

Typical network operations are limited to the transmission of electronic mail and the retrieval of data. A variety of standard network protocols and languages have been introduced to communicate over the networks. For example, in an ethernet based system, a protocol called Transmission Control Protocol/Internet Protocol (TCP/IP) is used to transfer information over the network. Some TCP/IP-compatible file transfer protocols have been devised to transfer information, such as File Transfer Protocol (FTP) and Hypertext Transfer Protocol (HTTP). These protocols allow programmers to create browsers which accept predefined languages, such as Hypertext Markup Language (HTML), however, these protocols and languages were not designed for network resource management.

One effort to define a language for network resource management resulted in the Simple Network Management Protocol (SNMP), however, SNMP requires special knowledge to use effectively and lacks certain device management features. A system using SNMP requires a special program executing at the client to perform system management. This program increases the cost and complexity of performing system management. With the proliferation of devices and users on the network there are increasing demands for improved network management of resources.

There is a need in the art for a system for network resource management which is cost effective and requires little or no specialized knowledge to use. The system should communicate using existing network commands and the system should operate with existing client browsers to eliminate the need for additional network resource management software at the client. The system should provide a homogeneous interface to perform network resource management using existing client-based network access software. The system should also be configurable to support nonstandard network resource management operations using existing network protocols and languages.

SUMMARY OF THE INVENTION

The present invention provides an improved system for network resource management. The present system provides network management functions using existing network user software. In one embodiment, clients perform platform independent network management using existing browser software. This embodiment enables a client to perform network management without the requirement of learning a specialized network management protocol or language.

In one embodiment, a client directly manages a network resource using any TCP/IP network by selecting specialized options using existing browser software. For instance, in an HTML environment a network resource is managed using an existing browser, such as NETSCAPE NAVIGATOR, MICROSOFT INTERNET EXPLORER, NCSA MOSAIC, or any HTTP-compatible browser. According to one embodiment, the network resource is programmed with a network module having an options database which provides one or more options to a client as it accesses the network resource. The options are tailored to the network resource device being controlled. The client selects options to request performance of operations by the network resource. In one embodiment, the network module is programmed with one or more native network resource instructions. These instructions are stored in a native resource instruction library. Options selected by the client are transmitted as messages over the network to the network resource and are interpreted by an instruction module by comparing each message to the one or more instructions in the native resource instruction library. The network module processes each received message to decide the appropriate operation. In one embodiment, the options presented to the client are updated and other fault/status information is available to the client to enhance the resource management by the client.

One environment in which the present invention is demonstrated is in a rack modem system. Device specific operations are demonstrated to illustrate the operation and flexibility of one embodiment of the present invention. In one embodiment, an ethernet interface is added to the rack modem system controller to provide network based management and control of the rack modem system. The ethernet interface enables users to manage the system using existing browser or web page protocols and languages. This enables a user to manage and control the system using existing software and without having to learn a specialized management protocol or language. This system enables management using any TCP/IP platform, including, but not limited to, UNIX, Windows 3.1, Windows 95, DOS, Solaris, or Apple platforms.

Additional applications and embodiments are described. For example, if the network resource is a modem, then the client will receive options for configuration of the modem and fault/status reporting. If the network resource is a router, then options may include routing commands for programming the routing of packets passing through the router. Therefore the options presented to a client are programmable and are not limited to a predefined set of operations.

A variety of option presentation methods are described. One embodiment provides flexibility in presentation of options to the client, since existing network protocols and languages support a variety of presentation methods, such as a checkbox list and image mapping. Existing protocols and languages also provide more advanced graphical user interfaces (GUIs). For example, Java applets and HTML extensions may be incorporated to create a GUI for platform independent browser based management. Any client having a compatible browser is enabled to perform network resource management without having to learn a specialized language or purchase additional software. The browsers, protocols, and languages described herein are intended to demonstrate the present network resource management system, and are not intended in a limiting or exclusive sense.

DETAILED SPECIFICATION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

For the purposes of this specification, any device or system associated with the network is a "resource" of the network. Physical layers or platforms, such as ethernet, include the physical portion of the network. Network protocols include, but are not limited to: Transmission Control Protocol/Internet (TCP/IP), Hyptertext Transfer Protocol (HTTP), File Transfer Protocol (FTP), proprietary resource management protocols, Telnet, and Simple Network Management Protocol (SNMP). Network languages include, but are not limited to: Hypertext Markup Language (HTML), Java, and Virtual Reality Modeling Language (VRML).

1. Network Resource Management System

Figure 1:
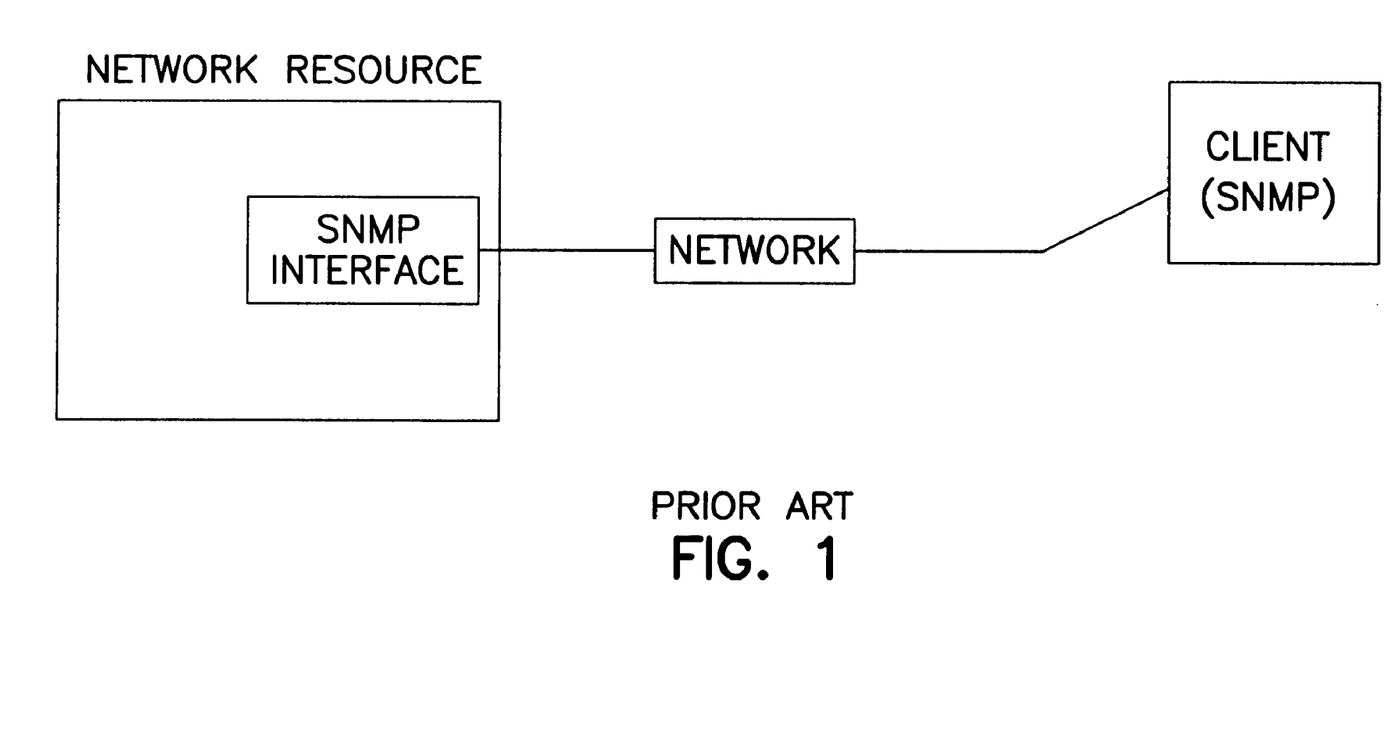
FIG. 1 is a block diagram of a prior art system for network resource management using the Simple Network Management Protocol (SNMP)

FIG. 1 shows a block diagram of a prior art system using the Simplified Network Management Protocol (SNMP) system to control a network resource. In this system, the client must provide SNMP instructions for controlling the network resource. The client is required to run a special program for SNMP network resource management. The client also needs to learn the SNMP protocol to perform network resource management.

Figure 2:
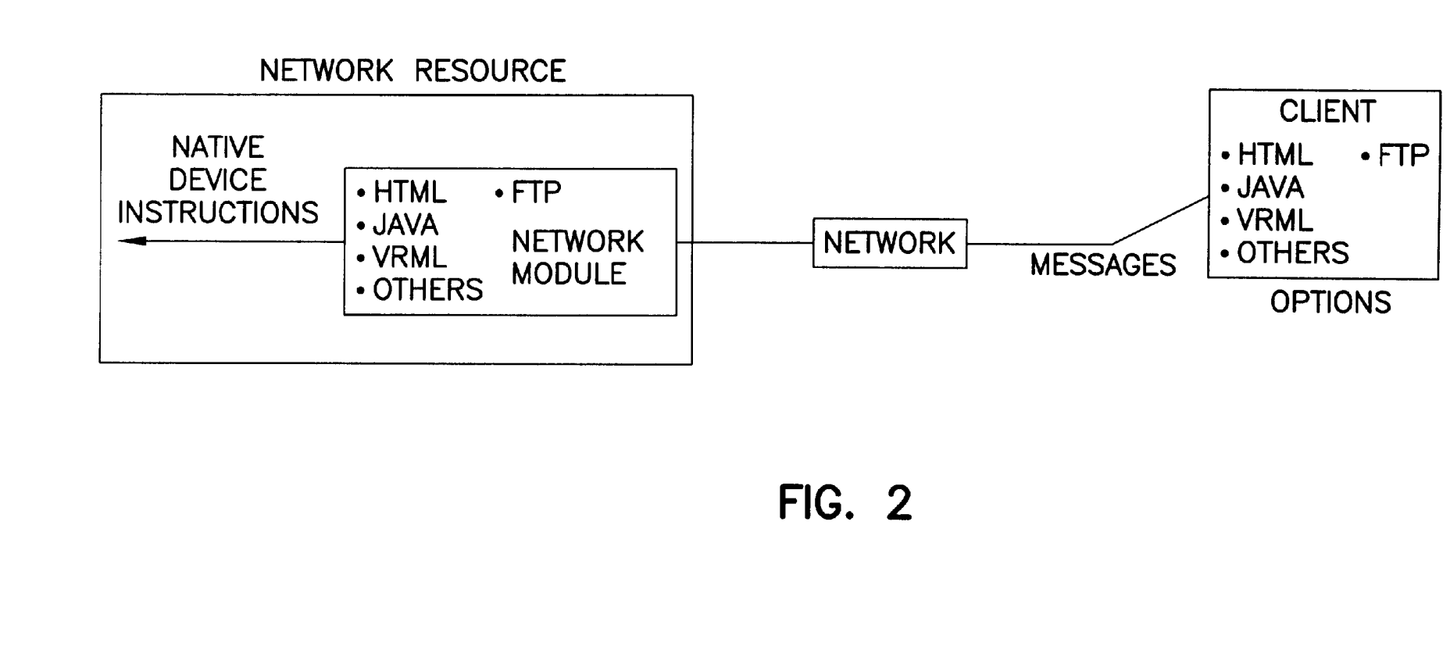
FIG. 2 is a block diagram of a network resource management system having a network module for communication using existing network protocols for resource management.

FIG. 2 shows a block diagram of one embodiment of the present network resource management system, whereby a number of existing protocols and languages are available for the system to manage the network resource. FIG. 2 shows that the network module supports several existing languages which are compatible with the Hypertext Transfer Protocol (HTTP). For example, languages which may be used include, but are not limited to, HTML, Java, and VRML. These languages may be used independently or in combination with each other for controlling the network resource, however, other protocols and languages may be used without departing from the scope and spirit of the present invention. For internet network resource management, any TCP/IP compatible protocol and language is acceptable for network resource management. The more popular the protocol, the more likely users will have a compatible browser for selecting management options and monitoring resource fault/status conditions.

Figure 4:
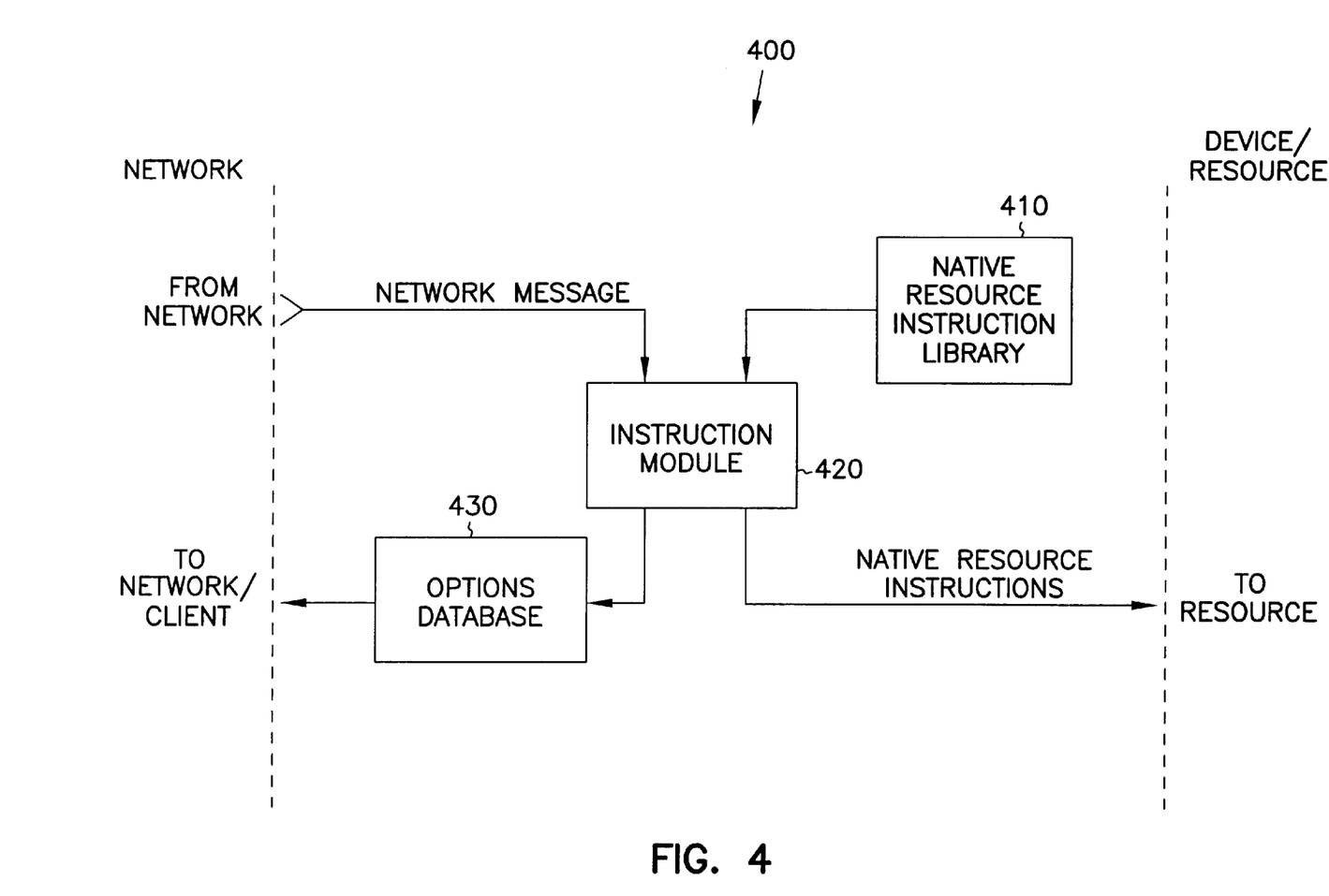
FIG. 4 is a block diagram of a network module, according to one embodiment of the present network resource management system.

FIG. 4 shows a block diagram of a network module, as generally shown in FIG. 2. The network module 400 contains a native resource instruction library 410 which is a compilation of the native resource instructions used by a particular network resource. Instruction module 420 translates messages from the client, received over the network, into native resource instructions. The instruction module 420 also updates an options database 430 after a message has been translated. The options database 430 is a menu of operations which the client may select from to manage the network resource. In one embodiment, the options database 430 is downloaded to the client upon accessing the network resource. The options database 430 is updated as operations are selected by the client, or to reflect status of the network resource. The updated options and/or status are transmitted to the client by the network module 400.

Figure 5:
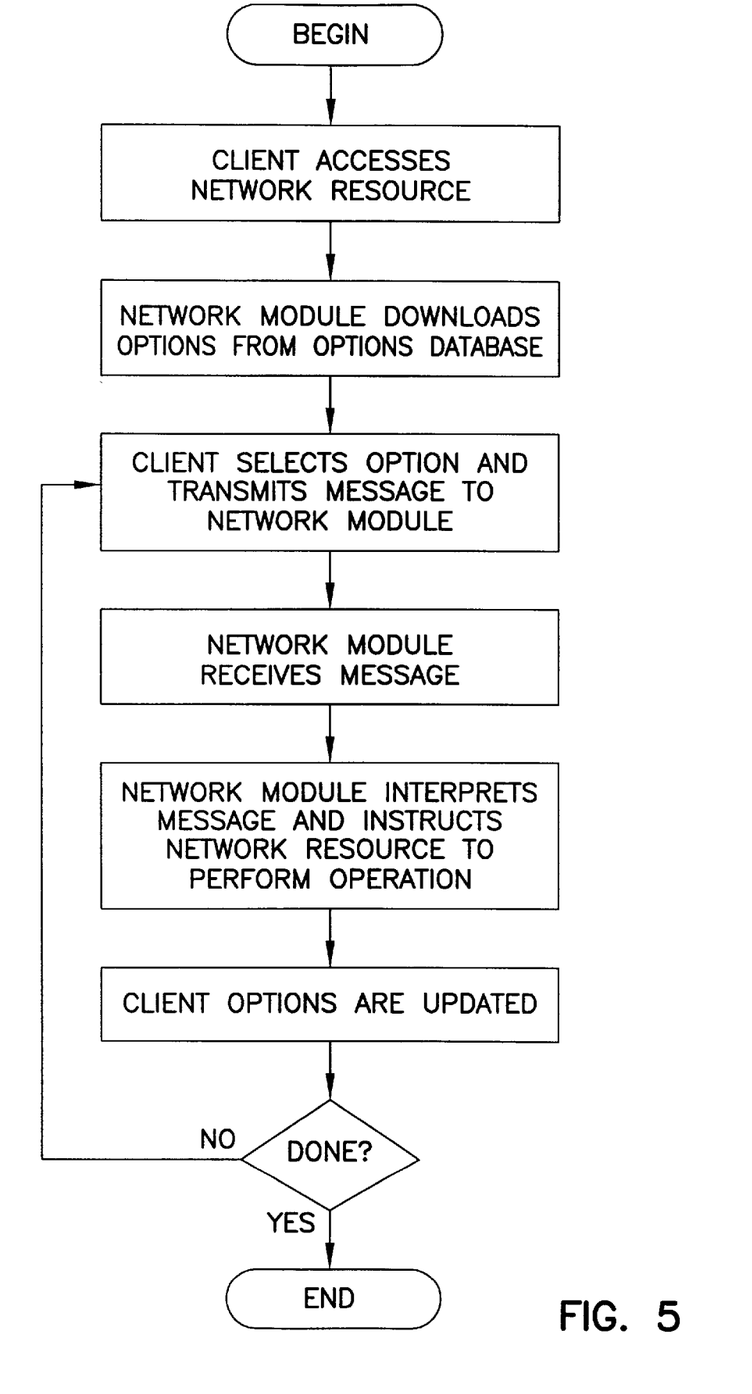
FIG. 5 is a flow chart demonstrating a resource management session according to one embodiment of the present network resource management system.

FIG. 5 shows a flowchart of a network resource management session. The client accesses the particular network resource. The resource responds by downloading one or more options to the client from the options database 430 in the network module 400. The options are preprogrammed for that particular network resource, and each option is associated with an operation to perform at the network resource. The options may identify a particular operation or function to be performed for managing and/or controlling the network resource. The client selects an option and the client's browser (or web page) automatically transmits a message based on the option selected. The message is interpreted by the instruction module 420 by comparing the message with the native resource instruction library 410 which is a compilation of the functions and operations associated with the network resource. In one embodiment the instruction module 420 contains logic to process the message and determine whether the requested function or operation is to be performed by the network resource. The network resource is instructed to perform authorized operations or functions. The options database 430 is updated and in one embodiment, the updated options are transmitted back to the client to update the view provided the client. This procedure is repeated until the session is completed.

The present detailed description provides several examples of user interfaces which may be implemented using a number of different programming protocols and languages. The examples are intended to demonstrate various embodiments of the present invention and are not intended in a limiting or exclusive sense. Other protocols and languages may be substituted without departing from the scope and spirit of the present invention.

The present network resource management system is available for incorporation in several applications. One example is in the management of a rack of modems, as described in the following sections.

2. Rack Modem Management

The following discussion will describe a rack modem system according to one embodiment of the present network resource management system, to demonstrate one embodiment of the present invention, however, this description is not intended to be exclusive or limiting. Other applications and embodiments are are described and the present network resource management system may be incorporated into numerous applications.

Figure 3:
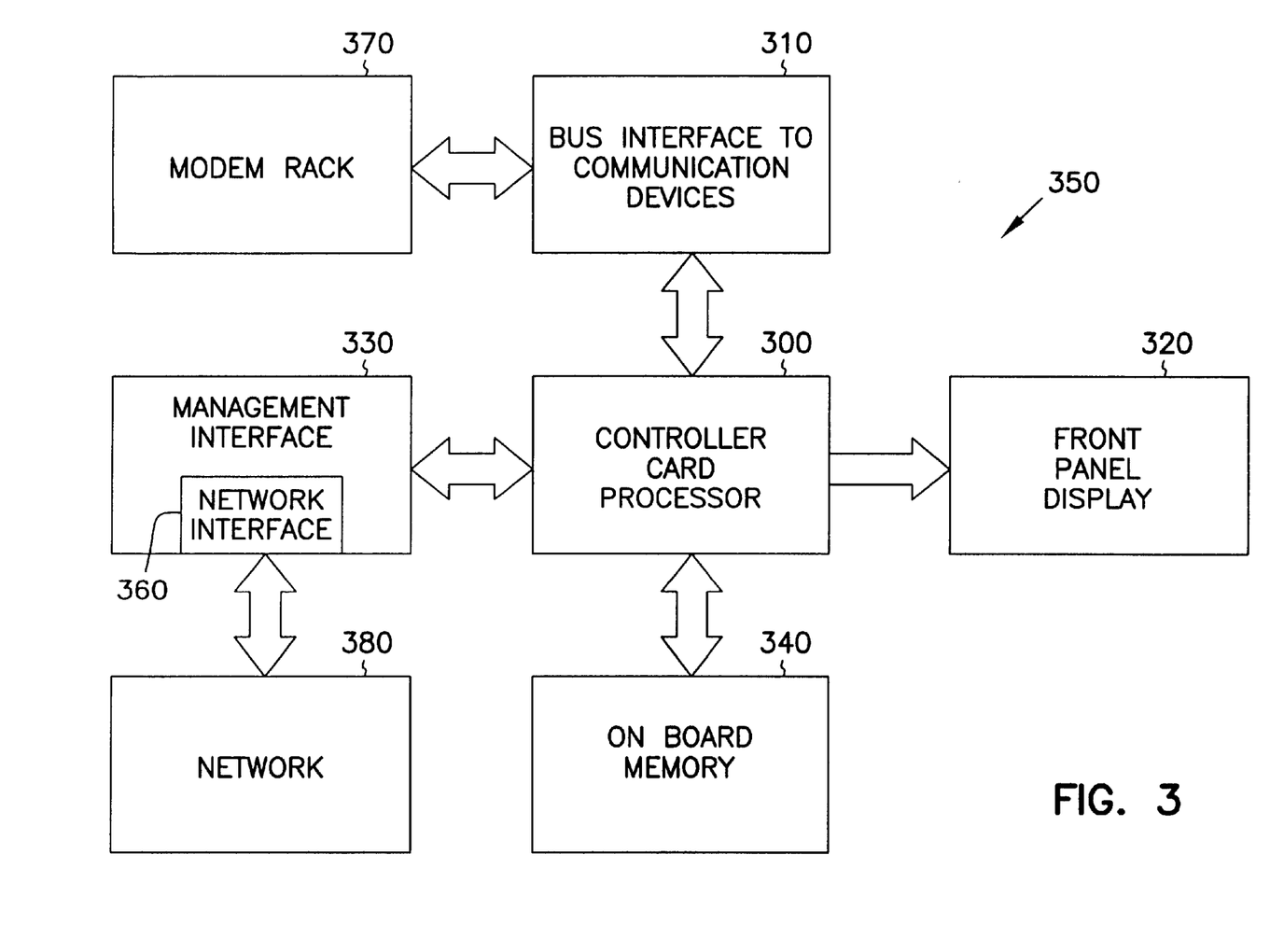
FIG. 3 is a block diagram of a rack modem system according to one embodiment of the present network resource management system.

FIG. 3 shows a block diagram of a rack modem system, which is one environment in which the present invention may be practiced. One such rack modem system is the MultiModemManager (MMM) System (TM), by Multi-Tech Systems Inc. (R), the assignee of this application. This system is described fully in the MultiModemManager User's Manual, Rev. G, Sep. 5, 1995, Copyright 1995 by Multi-Tech Systems, Inc., and in the MR4800E Rack Controller Owner's Manual, Copyright 1996 by Multi-Tech Systems, Inc.; both documents are hereby incorporated by reference in their entirety.

The rack modem system includes a bank of modems and a Windows based controller having features such as caller ID call management and security and statistical telephone call handling. The controller provides organization through rack groupings, visual feedback on system status, control over callback security options, fault/alarm status and corrective actions, diagnostic tools for testing, verifying and tracking modem operation, and automated modem configuration. The flexibility of the present system provides numerous interfaces to perform the control and management functions, as described below.

A general block diagram of the rack modem system 350 is shown in FIG. 3. The controller card 300 is responsible for coordinating the activities of the front panel display 320 and the memory 340. The controller card 300 also has an interface for other devices 310, such as a modem rack 370. The management interface 330 provides for management of the rack modem system 350. Commands are received from the network 380 at network interface 360. In one embodiment, network interface 360 is an ethernet or HTTP connection. In an alternate embodiment, network interface 360 is a Point-to-Point Protocol (PPP) connection. Other network connections may be used without departing from the scope and spirit of the present invention.

In one embodiment, the controller card 300 is MultiTech's MR4800E controller, which is described in detail in the MR4800E Rack Controller Owner's Manual, which was incorporated by reference in its entirety above. This controller incorporates a Motorola 68360 25 MHz processor and features four serial ports for backplane processing, PPP access, ethernet, and a monitor port. The MR4800E features 8MB of SIMMs memory, FLASH proms for program space, and a RAM drive. The controller 300 performs all processing needed for configurations, managing security tasks (user names and passwords), and maintains fault logs and call traffic logs. The controller 300 is configured to support remote management via browsers and web pages. The controller 300 also acts as an SNMP agent and performs FTP support and Telnet services. The MR4800E's operating system is a true multitasking real-time kernel, including tasks for FTP, SNMP, backplane communications and monitor activity. Additionally, it offers file management command, such as directory services, copy and rename.

The MR4800E controller allows the modem rack to be directly connected to the Internet, or any TCP/IP network via Ethernet, PPP, or HTTP. Management of the modem rack may be initiated anywhere the Internet access exists. Control is implemented via HTTP (i.e., browser or web page), or through SNMP management be either an SNMP manager, such as HP OpenView, SUN NetManage, IBM NetView, Novell NMS, or Multi-Tech proprietary software. Remote management is also available via a command line interface initiated over a Telnet session to perform management operations on the modem rack. The features include, but are not limited to, reset modems, set modems out of service, and report a particular modem's status.

FTP file transfers are used to maintain the various files used by the controller 300 in managing the operation of the modem rack system. Configuration file, event data, and security information may be transported to and from the remote POPs across the Internet using FTP. For example, a user may create a security file at the central site which is applicable to many remote sites and then FTP the file to those sites.

Rack Controller

The MR4800E rack controller contains the processor and memory for intelligent SNMP management of the modems in the rack. The front panel contains an RJ45 connection for Ethernet UTP attachment to a TCP/IP Ethernet network and a 9-pin serial connection for PPP attachment to a remote TCP/IP network. The front panel provides 16 two-color LEDs for MR4800E card status and 4 Ethernet status LEDs.

The MR4800E provides centralized modem rack management to control modems, continuously monitor connections, log the data, and report the fault events.

The MR4800E rack controller includes: one Motorola MC68360 25mz microprocessor; 8 MB of RAM for volatile storage; 2 MB of flash RAM: 1 MB for program space and 1 MB for nonvolatile file system space; Ethernet 10Base-T connector which is an RJ45 for LAN connection to TCP/IP Ethernet network; EIA RS232C connector for PPP connection to a TCP/IP Ethernet network; one RS232C configuration port out of the back of the rack; 16 two-color LEDs for quick view of modem card status; and 4 Ethernet status LEDs.

SECURITY

The MR4800E controller includes a security system to prevent unauthorized system modification by Telnet or FTP users who access the system via the diagnostic serial port on the back of the CC4800 rack. SNMP and MultiModemManager software security is done by the selection of SNMP read and write community strings.

There are three levels of security, guest, operator and supervisor. There are also default user-ids and passwords for each level:

|  | Supervisor | Operator | Guest |
| --- | --- | --- | --- |
| Security Level | Can perform all management commands | Can perform non-destructive management commands | Can only view information |
| Default User ID | supervisor | operator | guest |
| Default Password | supervisor | operator | guest |

Once logged in a user can change their user-id and password
USERID—Allows a user to change their user id
PASSWD—Allows a user to change their password
FILE SYSTEM The MR4800E utilizes a file system for storing configuration, security, and event information. There are two drives on the system: A and B. The A drive is used for non-volatile information such as configuration and security database files, and is about 1 MB in size. The B drive is for volatile information such as event files and is about 6.5 MB in size. Each drive has an MMM directory on it. A:\MMM stores all the configuration information for the system. B:\MMM\MR.LOG contains all of the event files for the system. The file system can be accessed either through the command line interface or by using FTP.

COMMAND LINE INTERFACE

The MR4800E provides a complete command line interface for management functions through either the MR4800E diagnostic serial connector or by using Telnet. When first setting up the MR4800E the MR4800E diagnostic serial connector may be used to set up the system's TCP/IP information (such as it's IP Address, Default Gateway IP Address, etc.)

When the system is accessed, either in Telnet or by using the serial port, the user will be prompted for a user id and password. A user id and password for the desired security level is entered (see above for a description of the security levels).

Once logged in, the screen shows the following information:

Welcome to MultiModemManager MR4800E
version 1.00
Press any key to start system manually...starting- ............done
Username: Supervisor
Password *********
A:\#

The command line prompt is the current directory followed by a '#' character. There are two drives formatted on the MR4800E, A and B, and a user can switch between them by using the CD command or by typing A: or B:. A standard set of DOS and UNIX file system commands are available.

There are commands to monitor activity on the modems in the rack. The commands GETMODEMS, GETCALLS, and GETFAULTS allow a user to see the current state of the modems, the connection history of the modems and the history of faults on the modems, respectively.

There are commands to change the current state of the modems. With the commands OOSSET, OOSCLEAR, RESET, CONFIG, a user can set modems in or out of service; reset them or configure them, respectively.

LOGOUT should be used when done using the command line interface so that the MR4800E is left in a secure state.

TELNET INTERFACE

Telnet is an internet protocol that allows the remote login between two systems connected to a TCP/IP network (such as the internet). The MR4800E can be managed remotely by using Telnet. Telnet will give the user access to all management functions through the command line interface.

FTP INTERFACE

FTP (File Transfer Protocol) is an internet standard protocol that allows the transfer of files between two systems connected to a TCP/IO network (such as the internet). The MR4800E acts as am FTP server so that the FTP clients can send/receive files from it.

FTP is necessary so that a user can transfer configuration files(*.cfg) to/from the system. If using MultiModeManager Security a user will need to transfer security files (*.db) to/from the system. To analyze event information, a user will need to transfer events files (*.hr) from the MR4800E to the system where a user can run the Statistical Analyzer on them. When logging in, a user must use the Supervisor user name and password.

PPP INTERFACE

PPP (Point-to-Point Protocol) is an Internet standard protocol that allows TCP/IP connections over a serial data link. The 9-pin serial connector of the front of the MR4800E is for a PPP connection to the MR4800E.

Software Description

The control and management software functions and operations supported by the rack modem system are numerous and have been included in a microfiche Appendix to this patent application. See Appendix B. Particular functions and operations will be discussed herein. The rack modem system includes several native instructions relating to the operation of the rack modem system, such as security, modem configuration, and modem status. Some of the native instructions are described in further detail in the following sections, below.

Instruction Translation

As described above, the instruction module 420 receives messages from the client over the network and translates them into native resource instructions using the native resource instruction library 410. Several operations are supported by the present system. To demonstrate operation of the system, a detailed description of a user request for fault/status information, web server processing of that request, and the generated output which is displayed to the client, is provided. In this example, a user of the network resource management system is assumed to be using an HTTP compliant browser accessing the control device via a TCP/IP network where both the client and server are IP addressable. The web server is running as part of a communications device. The controller's embedded hardware and software allow it to receive requests, processing requests and respond with output across a TCP/IP link.

User Request

Using a HTTP compliant browser, a user makes reference to a web server resource by entering a URL (uniform resource locator) which is comprised of the IP address of the web server (or its domain name) and full pathname to the resource.

Example:

HTTP://123.123.123.123/webmmm/getfaults

This reference my be entered directly by the user or indirectly activated as part of an HTML document using a hyperlink.

Example

```
<p>
System Operations:
<ul>
    <li><a href="webmmm/getfaults">Get Fault/Status Information</a>
    <li><a href="webmmm/getcalls">Get Connection Information</a>
    <li><a href="webmmm/getmodems">Get Modem Status
    Information</a>
</ul>
Communication Device Operations:
<ul>
    <li><a href="webmmm/config">Configure Device</a>
    <li><a href="webmmm/reset">Reset Device</a>
    <li><a href="webmmm/setoos">Place Device Out Of Service</a>
    <li><a href="webmmm/clearoos">Place Device In Service</a>
</ul>
```

Embedded Web Server Processing

The request is sent from the client browser to the web server embedded in the network resource (in this example, the rack modem system) using HTTP. Once the request has been received, the reference to the resource (i.e. "webmmm/getfaults") is parsed and the associated function or operation is called. The function or operation will perform a function or operation at the network resource (i.e. rack modem system), gather any requested information and produce the necessary output.

In one embodiment, the operation or function is retrieved from a table by locating the particular hyperlink reference called. For example, assuming that the following table is resident within the network module, the "webmmm/getfaults" reference would result in a call of the function "PerformGetFaults", as provided below:

Example:

| Hyperlink Reference | Function/Operation to Perform |
| --- | --- |
| webmmm/getfaults | PerformGetFaults |
| webmmm/getcalls | PerformGetCalls |
| webmmm/getmodems | PerformGetModems |

A reference of webmmm/getfaults would result in the resource performing the function PerformGetFaults, as shown below:

```
void PerformGetFaults( tRequest *Request )
{
    char *OuputBuffer;
    tFault Fault
    OutputBuffer = malloc( MAX_OUTPUT_BUFFER_LENGTH );
    OutputBuffer[0] = '\0';
    if( GetFirstFaultTableEntry( &Fault ) )
        // one or more faults exist in the fault table
        strcat( OutputBuffer, "<table>" );
        strcat( OutputBuffer, "<tr>" )
        strcat( OutputBuffer, "<th colspan=3 align=center>" );
        strcat( OutputBuffer, "Fault/Status Events" )
        strcat( OutputBuffer, "</th>" )
        strcat( OutputBuffer, "</tr>" )
        strcat( OutputBuffer, "<tr>" )
        strcat( OutputBuffer, "<th>Date/Time</th>" );
        strcat( OutputBuffer, "<th>Device</th>" );
        strcat( OutputBuffer, "<th>Message</th>" );
        strcat( OutputBuffer, "</tr>" );
        do {
            strcat( OutputBuffer, "<tr>" )
            strcat( OutputBuffer, "<td>" );
            strcat( OutputBuffer, Fault.DateTime );
            strcat( OutputBuffer, "</td>" );
            strcat( OutputBuffer, "<td>" );
            strcat( OutputBuffer, Fault.Device )
            strcat( OutputBuffer, "</td>" )
            strcat( OutputBuffer, "<td>" )
            strcat( OutputBuffer, Fault.Message );
            strcat( OutputBuffer, "</td>" );
            strcat( OutputBuffer, "</tr>" );
        )while( GetNextFaultTableEntry( &Fault ) );
        strcat( OutputBuffer, "</table>" );
    }
    else {
        // the fault table is empty
        strcat ( OutputBuffer, "<center>" )
        strcat ( OutputBuffer, "<h3>" )
        strcat ( OutputBuffer, "No Fault/Status Information" )
        strcat ( OutputBuffer, "</h3>" )
        strcat ( OutputBuffer, "</center>" )
    }
    ReturnOutputData( Request, OutputBuffer,
        strlen( OutputBuffer ) );
        free ( OutputBuffer );
}
```

The routine allocates an output buffer, retrieves faults and prepares outputs. The routine fills the output buffer with the desired information in HTML format and sends the output buffer back to the client browser for display. The results are returned to the user using an existing TCP/IP interface such as the Sockets interface. The user may perform another operation after this operation is completed.

Browser Based Management

TCP/IP offers additional protocols which are useful as management tools. File Transfer Protocol (FTP) may be used to receive files used by the communications device for configuration and security, and to transmit files containing communication event information which could be used for analysis. Telnet may be used to provide a simple command line interface to perform management operations (e.g. resetting devices, configuring devices, etc.). In one embodiment of the present network resource management system, Hypertext Transfer Protocol (HTTP) is used to create a graphical user interface (GUI) to management functions and information.

These TCP/IP protocols give the management and control of the MultiModemManager system platform independence. When developing a proprietary solution, one must development management software for each supported computer platform/operating system. Since the present system uses standard protocols (SNMP, FTP, Telnet, HTTP), the management is platform independent. Management of the system takes place from any platform residing on the same TCP/IP network (either internet or intranet).

HTTP allows for platform independent browser based management which provides an easy to use GUI that is extensible through the use of Java applets and Hypertext Markup Language (HTML) extensions. The following is a description of how a network module can be programmed to provide network resource management using existing browser software at the client. The following examples demonstrate one system of management centered around HTTP using HTML documents and Java applets which provide dynamic content and a useable management interface from any platform. Other protocols and languages may be substituted without departing from the scope and spirit of the present invention.

The MultiModemManager system is comprised of hardware and software components to allow for the control, configuration, analysis and security of communication resources. The management of those resources in many ways mirror this by providing the interface to those areas.

With SNMP, a Management Information Base (MIB) contains all the information available about a system. With browser based management, HTML documents will be used to get user input and display requested information. Where it is necessary Java will be used at the browser to process received data so that it can be more easily be displayed or recorded.

Access Control

Users of the browser based management will be prompted for their user name and password. Multiple levels of access are administered. Guest access allows the user to view information about the system, but is unable to perform any actions against the communications device. Operator access allows the user to perform simple non-destructive operations which are needed to maintain the system. Supervisor access allows full access to all administrative commands allowed by the communications device.

This security check must be passed in order to gain access to the browser based management system.

HTTP provides a basic challenge-response authorization mechanism that can be used to control access to an HTML page. Alternate embodiments incorporate additional schemes to increase security when necessary.

Control

In one embodiment, once access to the system is gained, HTML pages are used to get user input to perform tasks according the users access level. Hyperlinks are provided to various operations that can be performed.

The following is a demonstration using HTML source code to create a list of operations:

```
<p>
Communication Device Operations:
<ul>
    <li><a href="webmmm/config.html">Configure Device</a>
    <li><a href="webmmm/reset.html">Reset Device</a>
    <li><a href="webmmm/setoos.html">Place Device Out Of
    Service</a>
    <li><a href="webmmm/clearoos.html">Place Device In Service</a>
</ul>
```

To make the user interface more graphic, icons are used in alternate embodiments to represent the actions/operations to be performed. The icons are saved in Graphics Interchange Format (GIF).

```
<p>
Communication Device Operations:
<ul>
    <li><a href="webmmm/config.html">
        <img src="pics/config.gif">Configure Device</a>
    <li><a href ="webmmm/reset.html">
        <img src="pics/reset.gif">Reset Device</a>
    <li><a href="webmmm/setoos.html">
        <img src="pics/setoos.gif">Place Device Out Of Service</a>
    <li><a href="webmmm/clearoos.html">
        <img src="pics/clearoos.gif">Place Device In Service</a>
</ul>
```

Operations will be performed on the selected devices.

Device Selection

In order to perform operations, devices must be selected. As devices are selected, a selection list is created which will be used when performing operations. Only the devices in the selection list will have the operation performed. Select lists can be created by several methods, including a checkbox list and image map.

```
<form>
Which devices do you wish to select?
<p>
    <input type=checkbox name=select_list value="1a">Device 1A<br>
    <input type=checkbox name=select_list value="1b">Device 1B<br>
    <input type=checkbox name=select_list value="1c">Device 1C<br>
    <input type=checkbox name=select_list value="2a">Device 2A<br>
    <input type=checkbox name=select_list value="2b">Device 2B<br>
    <input type=checkbox name=select_list value="2c">Device 2C<br>
    <!-- etc -->
    <input type=submit value="Create Select List">
</form>
```

Organizing the checkbox controls with a HTML table creates an efficient user interface.

```
<form>
Which devices do you wish to select?
<table>
    <tr>
        <th colspan=3 align=center>Devices
    <tr>
        <td><input type=checkbox name=select_list value=
        "1a">Device 1A
        <td><input type=checkbox name=select_list value=
        "1b">Device 1B
        <td><input type=checkbox name=select_list value=
        "1c">Device 1C
    <tr>
        <td><input type=checkbox name=select_list value=
        "2a">Device 2A
        <td><input type=checkbox name=select_list value=
        "2b">Device 2B
        <td><input type=checkbox name=select_list value=
        "2c">Device 2C
    <tr>
        <!-- etc -->
    <tr>
        <td colspan=3 align=center>
            <input type=submit value="Create Select List">
</form>
```

In an alternate embodiment, the HTML source is generated in such a way as to show checkboxes for device that exist. If the device is not present, no checkbox is displayed. Once the selection list is set (submitted), it should be displayed for the user as either text or graphics.

A user friendly and visual selection list input control incorporates an image map. An image map can be used in much the same way as the checkboxes above, images would only be displayed for the devices that exist in the system. Once a device is selected, it is redrawn to show that it is selected. The image map is useful as both an input tool (creating a select list) and as an output tool (visual display of available devices and their selection status).

```
<img src="pics/device01.gif" usemap="#map01">
<img src="pics/device02.gif" usemap="#map02">
<!-- etc -->
<map name="map01">
    <area shape=rectangle coords="10, 10, 10" href="sel1a.html">
    <area shape=rectangle coords="10, 30, 10" href="sel2b.html">
    <area shape=rectangle coords="10, 50, 10" href="sel3c.html">
</map>
<map name="map02">
    <area shape=rectangle coords="30, 10, 10" href="sel2a.html">
    <area shape=rectangle coords="30, 30, 10" href="sel2b.html">
    <area shape=rectangle coords="30, 50, 10" href="sel2c.html">
</map>
<!-- etc -->
```

Note: Browsers handle image maps differently. They either perform server-side image map processing or client-side image map processing. The example above assumes client-side image map processing.

Configuration

Configuration of the communication devices takes on different forms in different embodiments; including, but not limited to, attaching a pre-defined configuration to a device or setting characteristics of a device. In any case, the configuration acts on the selected devices so that all selected devices end up with the same configuration modifications.

Predefined Configurations

Predefined configurations for a device may exist which maybe associated with a device in the system. The user is required to create a select list and pick which predefined configuration to associate with the list of selected devices.

```
<form>
    <pre>
    Select the predefined configuration for the device:
        <select name=config size=1>
            <option>Default
            <option>Configuration Alpha
            <option>Configuration Beta
        </select>
        <input type=submit value="Set Configuration">
    </pre>
</form>
```

Selecting Characteristics

In one embodiment, setting characteristics of a device involves the filling out of a form which contains a variety of controls (checkboxes, radio buttons, selects and text fields). The initial form displays the current settings for the device. The user updates the information and submits the form to update the characteristics of the communications device.

```
<form>
    <pre>
    Fill in the desired settings for the device:
        Device Name: <input type=text name=name size=
```

-continued
```
            32 maxlength=16>
        Short Name: <input type=text name=short size=3 maxlength=3>
            Usage: <select name=usage size=1>
                <option>Inbound
                <option>Outbound
                <option>Both
            </select>
        <!-- etc -->
        <input type=submit value="Set configuration">
    </pre>
</form>
```

Analysis

In one embodiment, browser management provides the user with snapshot views of the system or dynamic updates list and graphs showing system activity. Analysis is available in several forms, for example: fault/status reporting, connection reporting, and usage graph.

Fault/Status Reporting

As with many SNMP managers, TRAP reporting is an important management tool since it informs the system administrator as to a problem. Fault/status reporting performs that function under browser management.

In one embodiment, fault/status reporting is displayed as a straight text HTML document or as a table. From an organizational standpoint a table clearly shows the information.

```
<table>
    <tr>
        <th colspan=3 align=center>Fault/Status Events</th>
    </tr>
    <tr>
        <th>Date/Time</th>
        <th>Device</th>
        <th>Message</th>
    </tr>
    <tr>
        <td>05-13 13:20:53</td>
        <td>2B</td>
        <td>Loss of signal</td>
    </tr>
    <tr>
        <td>05-13 13:22:04</td>
        <td>4C</td>
        <td>Failed Security Check</td>
    </tr>
    <tr>
        <td>05-13 13:22:06</td>
        <td>6</td>
        <td>Device removed</td>
    </tr>
    <tr>
        <td>05-13 13:22:11</td>
        <td>7</td>
        <td>Device installed</td>
    </tr>
</table>
```

Connection Reporting

In one embodiment, connection reporting is very similar in method as to how fault/status reporting is performed. The information related to each connection active in the system may be displayed in a table.

```
<table>
    <tr>
        <th colspan=6 align=center>Connection Information</th>
```

-continued
```
    <tr>
    <tr>
        <th>Date/Time</th>
        <th>Device</th>
        <th>Type</th>
        <th>User Id</th>
        <th>Duration</th>
        <th>Phone Number</th>
    </tr>
    <tr>
        <td>05-13 13:18:06</td>
        <td>1C</td>
        <td>Orginate</td>
        <td></td>
        <td>
    </tr>
    <tr>
        <td>05-13 13:22:04</td>
        <td>4C</td>
        <td>Failed Security Check</td>
    </tr>
    <tr>
        <td>05-13 13:22:06</td>
        <td>6</td>
        <td>Device removed</td>
    </tr>
    <tr>
        <td>05-13 13:22:11</td>
        <td>7</td>
        <td>Device installed</td>
    </tr>
</table>
```

Usage Graph

In one embodiment, device usage is displayed as a table showing percentages indicating time connected verses idle broken down by time intervals, but this lacks the readability of a bar chart, pie chart or usage graph. With browser based management, charts and graphs may be used to display usage information by running Java applets that take raw data from the communications device and interpret it in a graph form.

The following is HTML source code dynamically created with parameters defined for the Java applet:

```
<title>Device Usage</title>
<hr>
<applet code="Chart.class" width=251 height=125>
<param name=title value="Device Usage">
<param name=columns value="4">
<param name=orientation value="horizontal">
<param name=scale value="5">
<param name=c1_label value="Idle">
<param name=c1_style value="solid">
<param name=c1_color value="blue">
<param name=c1_value value="20">
<paras name=c2_label value="Connected">
<param name=c2_style value="solid">
<param name=c2_color value="green">
<param name=c2_value value="65">
<param name=c3_label value="OOS">
<param name=c3_style value="solid">
<param name=c3_color value="yellow">
<param name=c3_value value="10">
<param name=c4_label value="Faulty">
<param name=c4_style value="solid">
<param name=c4_color value="magenta">
<param name=c4_value value="5">
</applet>
<hr>
```

An applet source code which takes the parameters provided by the HTML source and draws the bar chart may be found in microfiche Appendix A, attached to this patent application.

Frame Tags

HTML frame tags allow for a browser display to be partitioned in regions. In one embodiment the regions are further defined into input, output and input/output regions. This level of organization creates a consistent user interface to assist the user. Commands input in one region could be programmed to display output in other regions. A program illustrating the tags is attached to software Appendix A.

Operations and Functions Supported by the Rack Modem System

The native operations and functions required by a network resource are programmed into the native resource instruction library 410 of the network module 400. The present resource management system provides specialized operation options to the client by programming the options database 430 with a number of functions and operations for the network resource. A user at the client selects the desired operations and provides necessary parameters for completing the operation. The selected operations and any parameters are returned as messages over the network to the network module. The instruction module 420 processes the messages and issues native resource instructions to the network resource to perform the operations.

In one embodiment, the options having parameters are transmitted to the network module 400 using HTML forms. Where no parameters are used, the options are transmitted to the network module 400 using hyperlink references. Options may be requested with or without parameterization. For example, in the case where the network resource is the rack modem system, if a GETFAULT function is selected by a user at the client the user may indicate which device to perform fault reporting. This command also supports range limitations. For example, if the user specifies GETFAULT A1:16C, then the modem rack system reports faults on all devices labeled between A1 and 16C. If no parameters are specified, then the rack modem system displays all separate level faults that occurred.

Another operation supported by the rack modem system is the GETMODEM operation. If no parameters are specified, then the current status of all modems in the system are reported to the client terminal for presentation. If parameters are specified, then only the specified modem statuses are reported to the client for presentation. Another option is the GETCALLS operation, which displays recent call history for all modems specified (or all modems in the system if not parameterized by the user).

Several other functions are supported by the present system. Further details have been included in the microfiche appendix. See Appendix B.

Some of the functions supported by the present system include:

| Command Name | Parameters | Description |
| --- | --- | --- |
| clock | None | Displays current date and time |
| configure | Device (eg. 1A) | Configure the specified device with the configuration file associated (via SNMP) with that device |
| date | None | Prompts you for current date |
| getip | None | Display the configured IP address |
| getgateway | None | Display the configured gateway address |
| getsubnet | None | Display the configured subnet mask |
| gettrap | None | Display the configured trap address |
| logout | None | Logs you off of the system so next user has to login to get access. |
| oosclear | Device (eg. 1A) | Set the device at specified device In Service |
| oosset | Device (eg. 1A) | Set the specified device Out Of Service |
| passwd | None | Will prompt you for old, new, and new password |
| reset | Device (eg. 1A) | Reset the specified device |
| security | None | Allows the modification of a subordinate security levels username and password |
| setip | IP Address | Configure the IP address |
| setgateway | IP Address | Configure the gateway address |
| setsubnet | IP Address Mask | Configure the subnet mask |
| settrap | IP Address | Configured the trap address |
| time | None | Prompts you for current time |
| userid | None | Will prompt you for old, new, and new user id |
| whoami | None | Tells you what user is currently logged in |

Additional operations and details are described in the attached Appendix B. In one embodiment, the system is adapted to perform file system tasks as well as the above operations and functions, as shown in Appendix B.

3. Other Embodiments

Java Applets

In alternate embodiments incorporating Java applets, the use of Java applets improves the flexibility of the browser based network management system. In one embodiment, Java is used to interpret received data and display/format the information in a user-friendly model. Other features supported by Java are to paint displays to create improved input controls and creating web pages which are dynamic both as input or output devices.

E-mail Fault/Status Reporting

As faults occur in the system, various methods of notification are required to properly inform support staff as to a problem. In some embodiments, the methods include updating a fault/status display in the MMM software, sending a pager message via a modem or sending a TRAP via SNMP. Other embodiments include adding the ability to send faults by e-mail allows the operations staff to get faulty condition information while not running any special software at their station. These features also allow distribution of fault conditions to several support individuals.

In one embodiment, the e-mail system is utilized to distribute system usage reports that outline various areas of analysis: number of connections, up-time, connect speeds, fault summary, etc. A further extension to this embodiment is a system which automatically sends a trouble report directly to the company that manufactured the communications device when an unrecoverable fault has occurred in the system. This technical support aid is beneficial in both getting the customer back on-line and capturing vital information about the error condition.

VRML Support

In one embodiment, the network resource management system incorporates Virtual Reality Modeling Language (VRML) for the creation of the three dimensional view of the system. In this embodiment, the system configuration is displayed in such a way as to allow an analyst to "walk-around" the device to check out how it is functioning.

4. Other Applications

The present invention is applicable to any network resource, including, but not limited to: modems, ISDN, T1 channel banks, PRI channel banks, routers, gateways, bridges, and multiplexers. It is to be understood that the present invention is also applicable to any device which may be interfaced to a network.

It is to be understood, however, that even though numerous characteristics and advantages of the invention have been set forth in the foregoing description, together with details of the structure and function of the invention, the disclosure is illustrative only, and changes may be made in detail, especially matters of shape, size, and arrangement of parts within the principles of the invention, to the full extent indicated by the broad general meaning of the terms in which the appended claims are expressed.

What is claimed is:

1. A system for management of a network resource connected to a network by a client connected to the network and executing a browser compatible with a hypertext transfer protocol, the network resource comprising:

a network module interfacing the network resource to the network, the network module including:
an options database including one or more selectable options for operations relating to the network resource, the operations including reporting, configuration and control of the network resource;
a native resource instruction library including one or more native resource instructions for the network resource; and
an instruction module translating function calls into native resource instructions for the network resource using the native resource instruction library;
a web server transferring the one or more selectable options over the network using the hypertext transfer protocol, the web server processing hypertext transfer protocol requests from the client including one or more hyperlink references;
wherein a user of the client may generate the hypertext transfer protocol requests by selecting one or more selectable options received from the network module, the requests processed by the web server such that any hyperlink references in the requests are parsed by the web server and associated with function calls to the instruction module, the function calls indicating one or more native resource instructions for the network resource.

2. The system of claim 1, wherein the network resource comprises a communications device.

3. The system of claim 1, wherein the network resource comprises one or more modems.

4. The system of claim 1, wherein the one or more options includes an option to reset the network resource.

5. The system of claim 1, wherein the one or more options includes an option to report fault and status information between the network resource and the client.

6. The system of claim 1, wherein the one or more options includes an option for connection reporting.

7. The system of claim 1, wherein the one or more options includes an option to display network resource usage to the client.

8. The system of claim 1, wherein the one or more options includes an option to deactivate the network resource.

9. The system of claim 1, wherein the one or more selectable options are transmitted using a hypertext markup language.

10. The system of claim 1, wherein the one or more selectable options are transmitted using Java.

11. The system of claim 1, wherein the one or more selectable options are transmitted using a virtual reality modeling language.

12. A method for remote control of hardware in a network device connected to a network by a client, comprising:

storing one or more options in an options database in the network device, the one or more options for operations relating to remote control of hardware in the network device;

transferring the one or more options to the client with a web server communicating in a hypertext transfer protocol language compatible with a browser executing on the client;

upon selection of an option by a user of the client to form a request, transferring the request using the hypertext transfer protocol language to the web server which parses the request for one or more hyperlink references and calls an associated function in the instruction module for each of the one or more hyperlink references, wherein the instruction module translates the request into one or more native resource instructions using a native resource instruction library; and performing an operation at the network device based on the one or more native resource instructions.

13. The method of claim 2, further comprising the step of updating the one or more options transferred to the client.

14. The method of claim 2, wherein the one or more options includes an option to program configuration of the network device.

15. The method of claim 2, wherein the one or more options includes an option to deactivate the network device.

16. The method of claim 2, wherein the one or more options includes an option to reset the network device.

17. The method of claim 2, wherein the one or more options includes an option to report fault and status information between the network device and the client.

18. The method of claim 2, wherein the one or more options includes an option for connection reporting.

19. The method of claim 2, wherein the one or more options includes an option to display network device usage to the client.

20. The method of claim 2, wherein the one or more options are transmitted using a hypertext markup language.

21. The method of claim 2, wherein the one or more options are transmitted using a virtual reality modeling language.

22. The method of claim 2, further comprising the step of formatting a user interface using frame tags to partition user views.

* * * * *

UNITED STATES PATENT AND TRADEMARK OFFICE
CERTIFICATE OF CORRECTION

PATENT NO. : 6,219,708 B1
DATED : July 17, 2001
INVENTOR(S) : Dale W. Martenson

It is certified that error appears in the above-identified patent and that said Letters Patent is hereby corrected as shown below:

<u>Column 17,</u>
Line 33, delete "and".
Line 36, insert -- and -- after "library".

<u>Column 18,</u>
Line 10, delete "Java" and insert -- an object oriented programming language --.

Signed and Sealed this

Eleventh Day of December, 2001

Attest:

*Nicholas P. Godici*

NICHOLAS P. GODICI
*Attesting Officer*     *Acting Director of the United States Patent and Trademark Office*